Sept. 3, 1935.  A. C. BADGER  2,013,547
EXPANSION JOINT
Filed Sept. 14, 1932
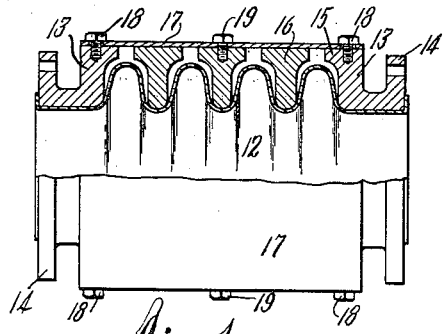
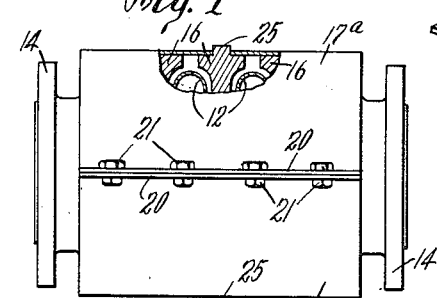
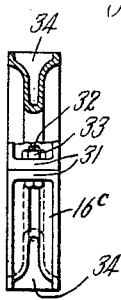
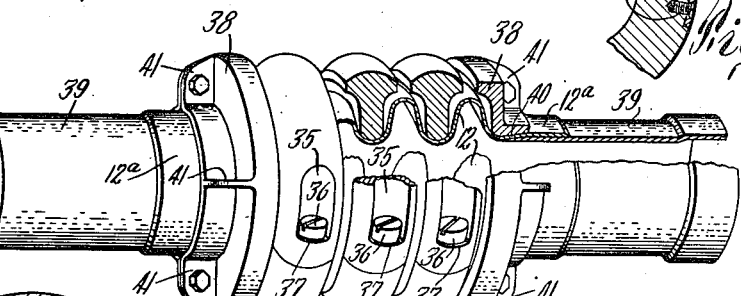
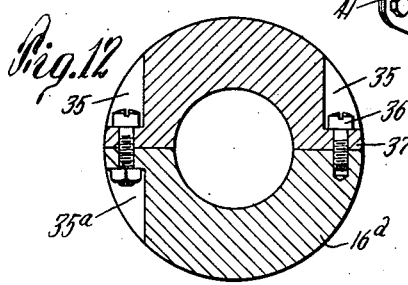
Inventor
Arthur C. Badger
by Wright, Brown, Quinby & Henny
att'ys Patented Sept. 3, 1935

2,013,547

UNITED STATES PATENT OFFICE 2,013,547

EXPANSION JOINT

Arthur C. Badger, Newton, Mass.; Theodore L. Badger and Robert H. Holt, executors of Arthur C. Badger, deceased, assignors, by mesne assignments, to Badger Fire Extinguisher Company, Boston, Mass., a corporation of Massachusetts Application September 14, 1932, Serial No. 633,069

9 Claims. (Cl. 285—90)

The present invention relates to expansion joints of the corrugated bellows type for insertion into pipe lines designed for the conveyance of steam, and other fluids as well, in conditions where considerable variations in temperature are to be expected. Expansion joints of this character are well known and commonly used, and it is also a common practice to use in connection with them controlling rings for limiting, and equalizing among the several corrugations, the strains due to shortening and lengthening of the joint with expansion and contraction, respectively, of the pipe sections to which the joint is connected.

The object of the invention is to provide for the art certain useful improvements in expansion joints of the character set forth, adapted to protect the corrugated bellows tube and controlling rings from foreign matter and mechanical injury, and to prevent sagging thereof; to facilitate assemblage of the endmost controlling rings with expansion joints of the welded type; and to provide improved means for connecting together the separable parts of any or all of the rings. The principles and particulars in which the invention consists are explained in the following specification in connection with the drawing which shows illustrative embodiments.

In the drawing,—

Fig. 1 is a view partly in section and partly in side elevation of an expansion joint embodying the invention;

Fig. 2 is a similar view showing a different form of means for coupling the protective shell with the controlling rings;

Fig. 3 is a perspective view of one half of the protecting shell of Fig. 2;

Fig. 4 is a perspective view of one half of a protecting shell of slightly different construction;

Fig. 5 is a perspective view of a protecting shell having an alternative means for securing its parts together in place;

Fig. 6 is a sectional view of one of the controlling rings showing two variants of means for connecting the separable parts thereof together;

Fig. 7 is a perspective view of a connecting clip usable for this purpose;

Fig. 8 is a sectional view showing another form of connecting means for the parts of the ring;

Fig. 9 is a partial side elevation and part section of another form of limit ring;

Fig. 10 is a perspective view of an expansion joint of the welded type having separable end limit rings;

Fig. 11 is a sectional detail view of the abutment between the end ring and tube of Fig. 10;

Fig. 12 is a cross section of one of the intermediate rings shown in Fig. 10.

Like reference characters designate the same parts wherever they occur in all the figures.

The expansion joint shown in Fig. 1 consists of a corrugated bellows tube 12, the ends of which pass through the bores of end fittings 13 and are flanged outwardly around the entrances to such bores. These fittings have, each, a flange 14 for connection with an adjacent flanged pipe, and a stop flange 15 beside the adjacent endmost corrugation of the bellows tube to serve the purpose of an end abutment or controlling ring. One or more intermediate rings 16 (as many as there are valleys or grooves between corrugations of the bellows tube) are situated between the end fittings. These rings have an inside diameter substantially equal to the outside diameter of the corrugated tube at the bottom of the grooves in which they are situated; and are so shaped in axial section as substantially to fit the toric curvature of the bottom of the groove, and to fill such groove and support the walls thereof when the joint is so shortened by expansion as to bring all of the rings and end fittings into contact with one another.

The assemblage above described is surrounded and encased by a jacket or shell 17 which covers the spaces between the controlling rings and excludes dirt, water and other foreign matter from these spaces. It also serves to prevent sagging of a long joint when placed horizontally, or other displacement or distortion of a joint placed in a vertical or inclined position. When the joint is first made up such jacket or shell is preferably secured immovably by bolts 18 to the end fittings, which not only retain it in place, but maintain an invariable length in the joint as a whole, preventing it from being stretched out, collapsed, or otherwise injured, in course of shipment and installation. When the joint has been installed and connected up with adjacent pipe sections, the bolts connecting the jacket with one of the end fittings (it is immaterial which one) are removed. Or bolts 19 may be used to connect the jacket with any one of the intermediate rings, and both the endmost bolts or sets of bolts 18 removed. However, by making some of the bolt holes in the jacket as slots sufficient to accommodate the maximum shortening of the joint, it is possible to keep in use the bolts at both ends, or at either or both ends and intermediate points. It will be understood that when such slots are provided, distortion of the joint prior to installation is prevented by screwing the bolts up tightly so that they clamp the jacket, after which the bolts are loosened enough to allow so much lost motion as is permitted otherwise by the slots.

The jacket or shell may be made in various ways. Fig. 1 shows it as a seamless tube. Figs. 2, 3, and 4 show it as composed of two semi-cylindrical shells 17a and 17b having flanges 20 at their meeting edges which are clamped together by bolts 21. Fig. 5 shows a variation in coupling means which consists of outturned lips 22 on the meeting edges of the two halves of the shell, facing away from one another and interlocked with the inturned flanges 23 of a clip 24; the latter being capable of sliding endwise into its locking engagement. But any form of divided shell may be made of a single piece, divided and provided with coupling means at one side only; the shell being flexible or resilient enough to permit of being opened at the division so widely as may be needed to place it around the joint. The one piece shell and the parts of the divided shell may be made of cast metal, drawn tubing, sheet metal shaped by any suitable method of fabrication, or nonmetallic substances suitably fabricated.

A mode of anchoring the shell, otherwise than by bolts, is shown in Figs. 2 and 3, and consists in providing one or more of the controlling rings, preferably the middle one, with a lug 25, or with two lugs diametrically opposite to one another, or a plurality of pairs of such lugs, on the outer circumference adapted to occupy a hole 26 in the shell. This connection is practical only with a shell of the divided type. The lug-receiving recesses in the shell may be holes 26 surrounded by the integral material of the shell, or of each section thereof; or they may be notches 27 cut inward from the edge or edges at either or both sides of the division line or lines. The same shell may contain both pierced holes and notches, as is shown by Fig. 4.

The controlling rings 16, that is, all of the limit abutments except those on the end fittings, are made in two parts to permit assembling with the corrugated tube. This is old practice. The means commonly used heretofore to connect the parts of the rings together are lugs projecting from the outer circumference of the ring, through which bolts are passed, as shown in my prior Patent No. 1,691,040, November 13, 1928. In the present invention, in order to accommodate the outer jacket without making it too large, the fastening means are sunk within the outer circumference of the ring. Several of the possible means for thus fastening the parts of a ring together are shown in the drawing. In Fig. 6 the parts 16a and 16b are made each with a slot adjacent to the cleavage plane adapted to receive the legs of a U-shaped coupler 28, and with a recess leading from the slot to the cleavage plane in which the web of the coupler may be sunk flush with the outer circumference. Preferably these slots are inclined to one another so that the legs of the coupler, when driven into them, will be bent to an inclination with one another and thereby anchored.

Fig. 8 shows a coupling consisting of a short metal strap 29 set into the circumference of the ring across the cleavage plane and connected to each half ring by a screw 30.

Fig. 9 shows a ring 16c externally recessed or cored out in a contour generally similar to the internal contour and having radial webs 31 at the cleavage plane which are connected to one another by bolts 32 and nuts 33. It may have optionally any desired number of intermediate stiffening webs 34 as well.

Figs. 10 and 12 show rings of which one part is recessed adjacent to the cleavage plane to provide niches 35 for the heads of connecting bolts 36 and ledges 37 to support the heads of these bolts. Such ledges are perforated and the holes therein register with holes in the other part of the ring. The latter holes may be tapped to mesh with the threads of the bolts, as indicated at the right hand side of Fig. 12; or the half ring 16d may also have niches, as 35a shown at the left hand side of Fig. 12, to accommodate a nut screwed on the protruding end of the bolt.

It will be understood that any of the rings, herein shown as being made of two parts, may be made of a greater number of parts if desired.

In Figs. 10 and 11 there are shown also divided rings 38 at the ends of the corrugated tube in place of the flanged fittings or rings shown in Figs. 1 and 2. The expansion joint with which these divided end rings are used is of the welded type in which the ends 12a of the corrugated tube are overlapped upon nipples or short pipe sections 39 and are welded or brazed thereto. Such nipples are adapted to be welded to adjacent pipe sections, or to be connected with a plug and socket type of joint, or they may be formed with flanges at their outer ends. To anchor the end rings 38 so that they will not slide apart, the corrugated tube is provided with a zone 40, of smaller diameter than the end of the tube, between each end and the adjacent endmost corrugation; and each end ring is of appropriate internal diameter to occupy one of such zones and to abut against its outer, enlarging, side. Preferably these zones are tapered with a gradual outward enlargement from the base of the endmost corrugation toward the nearer end of the tube (although they may have other contours) formed by expanding the extremities of the tube to larger than original diameter. The halves (or other fractional parts) of the divided end rings have webs 41 at the outer side, by which they are bolted together after being placed in position. In connecting the parts of these rings together they are clamped tightly on the corrugated tube in such manner that the beveled or offset zone 40 at each end prevents any outward displacement of the end ring.

The joint shown in Fig. 11 may be equipped with an external jacket similar to either of those previously described, and may be equipped with intermediate rings of any of the precedently described characteristics. But the jacket has been omitted from this figure for greater clearness of illustration.

It will be understood that variations and modifications from the details herein shown and described may be made within the scope of my invention; and that any of the expansion joints within this scope may be fabricated in all practicable diameters and lengths, with any practicable number, from one upward, of corrugations.

What I claim is:

1. An expansion joint comprising a flexible corrugated tube, end fittings at the outer side respectively of the endmost corrugations, intermediate rings in the grooves between the successive corrugations cooperating with one another and with the end fittings to limit shortening distortion of the joint, a jacket surrounding said rings and the adjacent parts of the end fittings, and means rigidly connecting the jacket to the end fittings and an intermediate ring to prevent distortion of the joint during shipment and installation; the connecting means with the end fittings being releasable to an extent adequate for permitting necessary shortening of the joint in service, while that with the intermediate ring remains.

2. An expansion joint as set forth in claim 1, in which the intermediate rings are divided on diametral planes, and detachable connecting means for securing the divided parts thereof together are inset within the outer circumference of the ring.

3. An expansion joint as set forth in claim 1, in which the end fittings also are divided rings, the parts of which are connected together, and the corrugated tube is narrower in the zones embraced by said end fittings than at the ends, combined with inserted rigid nipples beveled to provide shoulders preventing outward displacement of the end fittings.

4. An expansion joint comprising a flexible corrugated tube and divided controlling rings surrounding said tube, nipples protruding into the ends of said tube and secured therein, adjacent to the outer sides of the outermost corrugations thereof, the tube being of smaller diameter in the zones surrounded by said rings than at the end, and the inner circumferences of the rings being formed complemental to such contracted zones, whereby to prevent movement of the rings longitudinally of and relatively to the tube.

5. An expansion joint comprising a flexible corrugated tube having an outwardly tapering zone between its endmost corrugations and its adjacent end, a tapered nipple secured within said zone, and a limit ring surrounding and fitting said tapered zone and being restrained thereby from sliding movement on the tube toward the adjacent end.

6. An expansion joint comprising a flexible corrugated tube having an end expanded to a diameter greater than the diameter at the base of the adjacent corrugation, a tube section or nipple fitted within the expanded end of the tube and integrally united thereto, and a series of controlling rings surrounding said tube so as to flank the corrugations thereof and limit shortening movement, the endmost ring being fitted to the zone between said expanded end and the adjacent corrugation and prevented thereby from sliding endwise on the tube.

7. An expansion joint comprising a flexible corrugated tube, annular limit members surrounding said tube adjacent to the ends thereof, an intermediate limit member occupying a valley between the endmost corrugations of said tube and having an outwardly protruding lug, a longitudinally divided jacket surrounding said limit members and having a perforation in which said lug is contained and with the opposite bounds of which the lug cooperates to prevent endwise relative movement of the jacket, and means for detachably connecting the parts of said jacket to one another.

8. An expansion joint comprising a flexible corrugated tube, annular limit members surrounding said tube and having laterally extending portions outside of the corrugations of the tube for engagement with one another in shortening of the tube to limit collapsing distortion of the corrugations, a longitudinally divided jacket surrounding said limit members and connected with one of them, the parts of said jacket having lips on their meeting edges turned outwardly and away from one another, and a clip overlying said lips and having inturned flanges interlocked with the lips.

9. An expansion joint comprising a flexible corrugated tube an end of which is of enlarging tapered formation from the contiguous corrugation, a tube section or nipple fitted within said tube end, having an external taper complemental to the said tapered formation, and being brazed to the corrugated tube throughout substantially the entirety of their overlap, and control rings surrounding the corrugated tube on opposite sides of each corrugation thereof, the endmost ring being fitted to the exterior of said tapered formation closely enough to secure it against endwise separation from the adjacent corrugation.

ARTHUR C. BADGER.